(12) United States Patent
Tojo (10) Patent No.: US 7,680,339 B2
(45) Date of Patent: Mar. 16, 2010

(54) IMAGE PROCESSING METHOD AND APPARATUS FOR EDGE DETECTION IN AN IMAGE

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1165 days.

(21) Appl. No.: 11/253,582

(22) Filed: Oct. 20, 2005

(65) Prior Publication Data

US 2006/0088218 A1    Apr. 27, 2006

(30) Foreign Application Priority Data

Oct. 27, 2004    (JP)    .............................. 2004-312855

(51) Int. Cl.
*G06K 9/48*    (2006.01)
*G06K 9/36*    (2006.01)

(52) U.S. Cl. ...................................... 382/199; 382/276

(58) Field of Classification Search .................. 382/199, 382/276
See application file for complete search history.

(56) References Cited

U.S. PATENT DOCUMENTS

| 5,629,989 | A  | * | 5/1997  | Osada ........................ 382/281 |
| 6,445,832 | B1 | * | 9/2002  | Lee et al. .................... 382/266 |
| 6,584,221 | B1 | * | 6/2003  | Moghaddam et al. ....... 382/165 |
| 6,792,147 | B1 | * | 9/2004  | Saka et al. .................. 382/199 |
| 6,807,298 | B1 | * | 10/2004 | Park et al. ................... 382/165 |
| 6,987,886 | B1 | * | 1/2006  | Okubo et al. ............... 382/194 |
| 2002/0031246 | A1 | * | 3/2002  | Kawano ...................... 382/132 |
| 2002/0191818 | A1 | * | 12/2002 | Matsuo et al. .............. 382/118 |
| 2004/0037465 | A1 | * | 2/2004  | Krause ........................ 382/199 |
| 2005/0013486 | A1 | * | 1/2005  | Wiedemann et al. ........ 382/181 |
| 2005/0185822 | A1 | * | 8/2005  | Slaski ......................... 382/103 |
| 2006/0020203 | A1 | * | 1/2006  | Tamura ....................... 600/437 |

FOREIGN PATENT DOCUMENTS

| JP | 2-18681   | 1/1990 |
| JP | 4-115374  | 4/1992 |
| JP | 8-123966  | 5/1996 |
| JP | 10-247247 | 9/1998 |

OTHER PUBLICATIONS

English translation of Japaness patent document JP 4-115374 (publication data: Apr. 16, 1992, IDS), translated by FLS, Inc. in Feb. 2009. PTO 09-2749.*
Won, Chee Sun et al., "Efficient Use of MPEG-7 Edge Histogram Descriptor", ETRI Journal, vol. 24, No. 1, Feb. 2002, pp. 23-30.
Office Action, dated Sep. 5, 2008, in JP 2004-312855.

* cited by examiner

*Primary Examiner*—Samir A. Ahmed
*Assistant Examiner*—Li Liu
(74) *Attorney, Agent, or Firm*—Fitzpatrick, Cella, Harper & Scinto (57) ABSTRACT

When the edge magnitude of an image-block of interest is larger than both that of the image-block of interest after movement and that of an image-block which neighbors the image-block of interest in the moving direction (S7110, S7120), the edge magnitude and direction of the image-block of interest are updated to those of the image-block of interest after movement (step S7130).

7 Claims, 12 Drawing Sheets

| IMAGE ID | EDGE HISTOGRAM | PATH TO IMAGE FILE |
|----------|----------------|--------------------|
| 1 | Eij | c:¥picture¥dog.bmp |
| 2 | Eij | c:¥picture¥cat.bmp |
| ... | ... | ... |

IMAGE PROCESSING METHOD AND APPARATUS FOR EDGE DETECTION IN AN IMAGE

FIELD OF THE INVENTION

The present invention relates to an edge detection technique in an image.

BACKGROUND OF THE INVENTION

Conventionally, various image retrieval methods and recognition methods using edge features have been proposed. As an edge extraction method, it is a common practice to make an arithmetic operation for a range including each pixel of interest and its surrounding pixels using a differential filter. As such filter, a Prewitt filter, Sobel filter, Robinson filer, Kirish filter, and the like may be used. When an edge feature is used in, e.g., image retrieval, an edge distribution in an image is extracted as a feature amount in many cases.

An edge histogram in the prior art uses an edge extraction method required to obtain an edge distribution with lower calculation cost than a method using a Sobel filter or the like (see ETRI Journal, Volume 24, Number 1, February 2002 ("Efficient Use of MPEG-7 Edge Histogram Descriptor" Chee Sun Won et al.)).

Figure 1A:
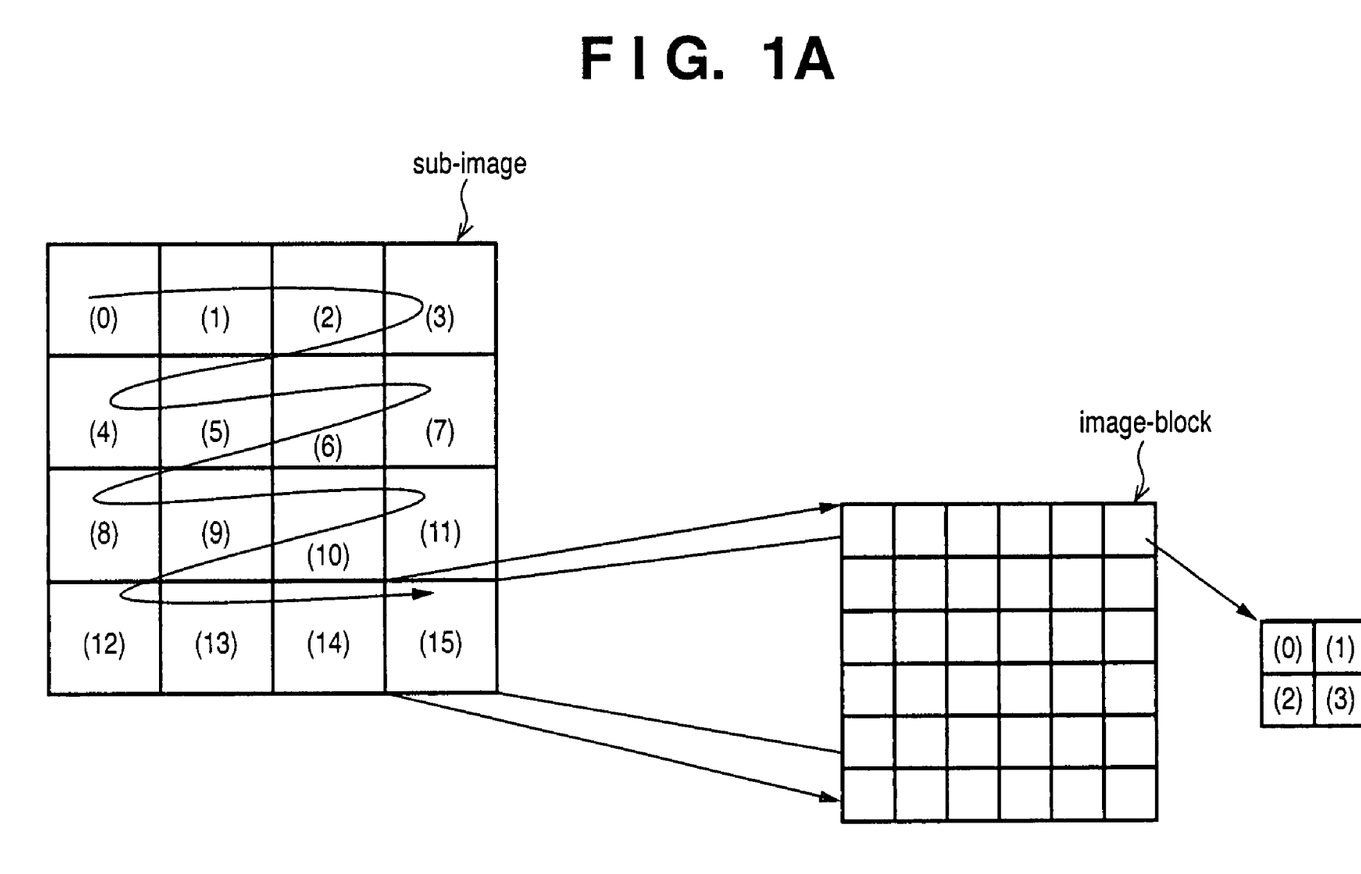
FIG. 1A is a view for explaining division of an input image into image-blocks.

As shown in FIG. 1A, an input image is divided into 4×4 sub-images. Furthermore, each sub-image is divided into squares (image-blocks), the number of which becomes close to a predetermined value. Next, each image-block is divided into four (=2×2), and the average brightness value of each small region is calculated.

Figure 1B:
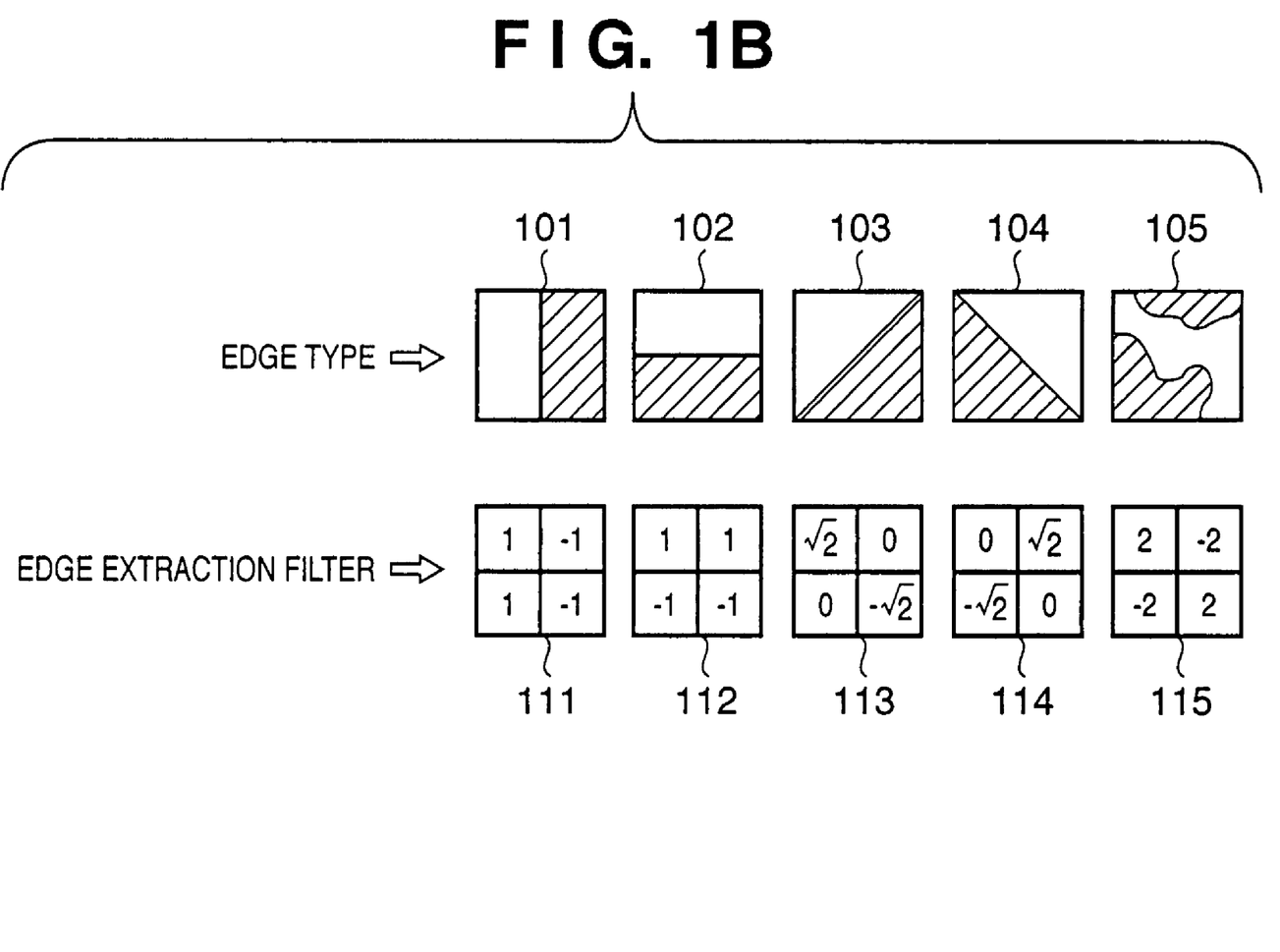
FIG. 1B is a view for explaining edge filters.

Next, using filters 111 to 115 corresponding to four directions (vertical direction 101, horizontal direction 102, 45° direction 103, and 135° direction 104), and a non-direction 105, edge magnitudes m_v, m_h, m_d45, m_d135, and m_nd are calculated. Let a(n) be the average brightness value of each of four-divided small regions of an image-block. For example, m_v is expressed by:

$$m\_v = |1 \times a(0) + (-1) \times a(1) + 1 \times a(2) + (-1) \times a(3)| \quad (1)$$

for n=0 to 3 (n indicates a number assigned to each of four-divided small regions)

When a maximum value of the edge magnitudes (m_v, m_h, m_d45, m_d135, and m_nd) is equal to or larger than a predetermined threshold A, it is determined that the direction of that maximum value is an edge direction of the image-block of interest. The threshold A is a lower limit value of the magnitude that can be considered as the presence of edge. By counting the edge directions of image-blocks included in respective sub-images, edge histograms Eij are calculated (note that i=0 to 4 corresponds to respective filters, and j=0 to 15 corresponds to sub-images). These edge histograms are extracted as a feature amount.

However, the edge extraction method obtained by the above non-patent reference 1 can reduce the calculation cost compared to that using a Sobel filter or the like, but often cannot sufficiently obtain edge features.

Figure 9A:
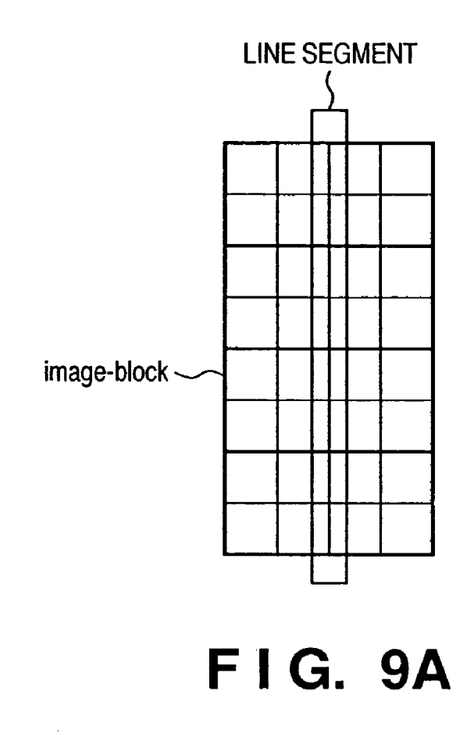
FIGS. 9A and 9B are views for explaining edge extraction processing.

A conspicuous example in which edge features cannot be sufficiently obtained will be explained below taking a line image as an example. Depending on locations of image-blocks in a line image, the edge of a line segment of the line image can or cannot be extracted. For example, when a line segment passes through the boundary of image-blocks, as shown in FIG. 9A, it occupies only small areas in the image-blocks. Hence, if the average brightness values are calculated, the influence of the line segment is reduced, and nearly no difference of the average brightness values is generated among small regions, thus failing to extract any edge.

Figure 9B:
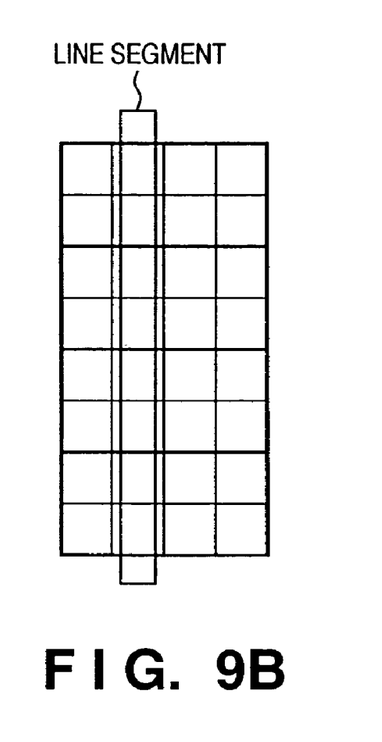

On the other hand, when a line segment falls within half image-blocks, as shown in FIG. 9B, if the average brightness values are calculated, the influence of the line segment is sufficient. Hence, an edge in the vertical direction can be detected. Of course, even in case of FIG. 9A, when the threshold A is decreased, an edge can be detected. However, even a slight average brightness difference is extracted as an edge in turn, and noise or the like is erroneously extracted as an edge.

Image-blocks may often be formed at different positions in images with the same contents. For example, two images include an object (a vase or the like) which appears on a plain background, but they have different object positions. Also, in case of an image stored in a hard disk and an image obtained by scanning the printout of that image using a scanner, image positions shift depending on a position where a paper sheet is placed on the scanner.

Upon comparison of these two images, an edge may be extracted from one image but it may not be extracted from the other image. As a result, these images cannot be determined as identical images.

SUMMARY OF THE INVENTION

The present invention has been made in consideration of the above problems, and has as its object to provide a technique which is faster than a method using a Sobel filter or the like and can obtain sufficient edge features used in image retrieval or the like.

In order to achieve an object of the present invention, for example, an image processing method of the present invention comprises the following arrangement.

That is, an image processing method comprising:

a division step of dividing an image into a plurality of regions;

a first edge information calculation step of calculating information associated with an edge from an image of a region of interest;

a second edge information calculation step of calculating, when the region of interest is moved by a predetermined amount in a predetermined direction in the image, information associated with an edge from the image of the region of interest after the movement;

a third edge information calculation step of calculating information of an edge of a region which neighbors the region of interest in the predetermined direction; and a determination step of determining information associated with an edge in the region of interest on the basis of the information calculated in the first, second, and third edge information calculation steps.

In order to achieve an object of the present invention, for example, an image processing method of the present invention comprises the following arrangement.

That is, an image processing method comprising:

a division step of dividing an image into a plurality of rectangles;

a detection step of detecting an edge magnitude and direction of each of the rectangles divided in the division step;

a calculation step of calculating, when a rectangle of interest is moved by an amount not more than one rectangle size in the image, an edge magnitude in a direction perpendicular to the moving direction from the image of the rectangle of interest after the movement; and a determination step of determining an edge magnitude and direction in the rectangle of interest on the basis of the edge magnitude detected in the detection step and the edge magnitude calculated in the calculation step in association with the rectangle of interest.

In order to achieve an object of the present invention, for example, an image processing apparatus of the present invention comprises the following arrangement.

That is, an image processing apparatus comprising:

division means for dividing an image into a plurality of regions;

first edge information calculation means for calculating information associated with an edge from an image of a region of interest;

second edge information calculation means for, when the region of interest is moved by a predetermined amount in a predetermined direction in the image, calculating information associated with an edge from the image of the region of interest after the movement;

third edge information calculation means for calculating information of an edge of a region which neighbors the region of interest in the predetermined direction; and determination means for determining information associated with an edge in the region of interest on the basis of the information calculated by the first, second, and third edge information calculation means.

In order to achieve an object of the present invention, for example, an image processing apparatus of the present invention comprises the following arrangement.

That is, an image processing apparatus comprising:

division means for dividing an image into a plurality of rectangles;

detection means for detecting an edge magnitude and direction of each of the rectangles divided by the division means;

calculation means for, when a rectangle of interest is moved by an amount not more than one rectangle size in the image, calculating an edge magnitude in a direction perpendicular to the moving direction from the image of the rectangle of interest after the movement; and determination means for determining an edge magnitude and direction in the rectangle of interest on the basis of the edge magnitude detected by the detection means and the edge magnitude calculated by the calculation means in association with the rectangle of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 2:
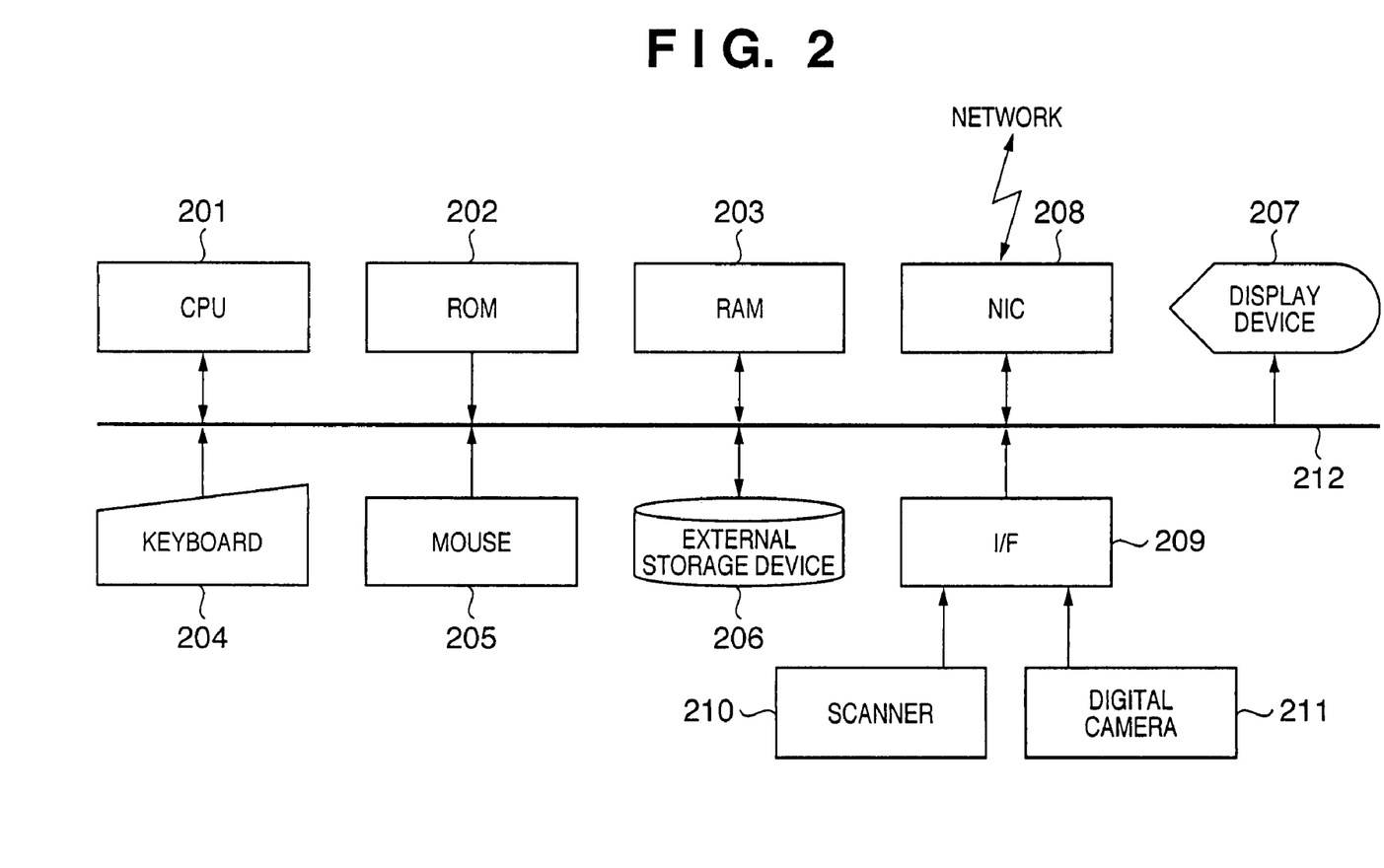
FIG. 2 is a block diagram showing the basic arrangement and peripheral devices of a computer which serves as an image processing apparatus according to the first embodiment of the present invention.

FIG. 2 is a block diagram showing the basic arrangement and peripheral devices of a computer which serves as an image processing apparatus according to this embodiment. Note that, for example, a general PC (personal computer), WS (workstation), and the like can be applied as this computer.

Referring to FIG. 2, reference numeral 201 denotes a CPU which controls the overall computer, and executes respective processes to be described later executed by the computer.

Reference numeral 202 denotes a ROM which stores setting data, a boot program, and the like of this computer.

Reference numeral 203 denotes a RAM which comprises an area for temporarily storing programs and data loaded from an external storage device 206, an area for temporarily storing data received via an NIC (network interface) 208, and an area for temporarily storing image data captured from a scanner 210 and digital camera 211 via an I/F (interface) 209. The RAM 203 also comprises a work area used when the CPU 201 executes various processes.

Reference numerals 204 and 205 respectively denote a keyboard and mouse, which can input various instructions to the CPU 201 when they are operated by the user, as is well known.

Reference numeral 206 denotes an external storage device which serves as a large-capacity information storage device such as a hard disk drive device. The external storage device 206 saves an OS (operating system), programs and data which make the CPU 201 execute respective processes to be described later executed by the computer, and the like. When some or all of these programs and data are loaded onto the RAM 203 under the control of the CPU 201, and the CPU 201 executes processing using these programs and data, this computer can execute respective processes to be described later as its own processes.

Reference numeral 207 denotes a display device which comprises a CRT, liquid crystal display, or the like, and can display the execution result of the CPU 201 by means of images, characters, and the like.

Reference numeral 208 denotes an NIC (network interface), which serves as an interface upon exchanging data via a network such as a LAN, Internet, or the like. The NIC 208 suited to either a wireless or wired network can be used.

Reference numeral 209 denotes an I/F such as IEEE1394, USB, or the like, which is used to connect the scanner 210 and digital camera 211 to this computer. Data of an image scanned from a printing medium such as a paper sheet or the like by the scanner 210 and data of an image sensed by the digital camera 211 can be input to this computer via this I/F 209.

Reference numeral 212 denotes a bus which interconnects the aforementioned units.

Reference numeral 210 denotes a general scanner; and 211, a general digital camera.

In the above arrangement, the external storage device 206, scanner 210, and digital camera 211 may be connected on the network and make data communications via the NIC 208.

Figure 3:
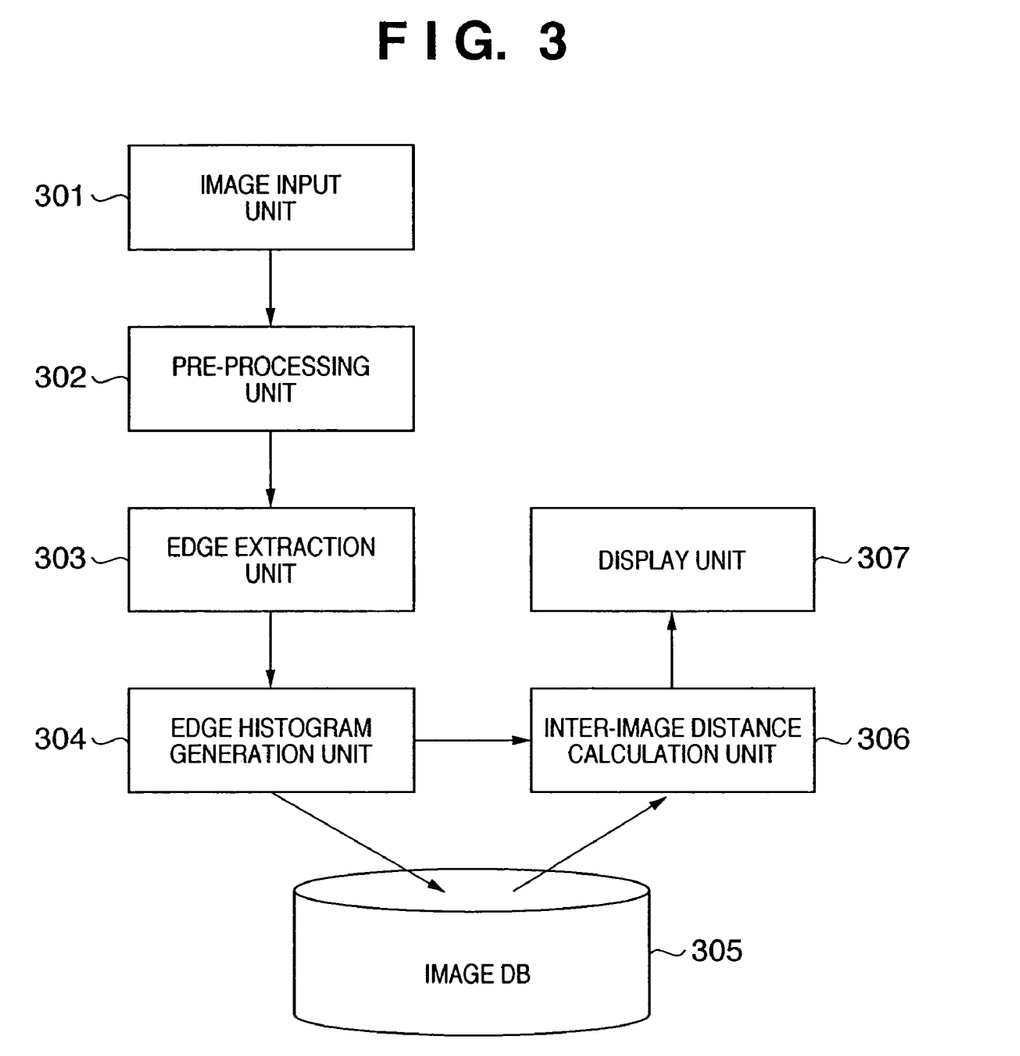
FIG. 3 is a block diagram showing the functional arrangement of the computer.

FIG. 3 is a block diagram showing the functional arrangement of the computer.

Referring to FIG. 3, reference numeral 301 denotes an image input unit which inputs an image captured by a device such as the scanner 210, digital camera 211, or the like via the interface 209, or an image held by a device on the Internet via the NIC 208.

Reference numeral 302 denotes a pre-processing unit which applies pre-processing to an input image. Reference numeral 303 denotes an edge extraction unit which executes processing for extracting edges from the image pre-processed by the pre-processing unit 302. Reference numeral 304 denotes an edge histogram generation unit which generates an edge histogram on the basis of the edges extracted by the edge extraction unit 303.

Reference numeral 305 denotes an image database (DB) which stores and manages the images pre-processed by the pre-processing unit 302 and the edge histograms generated by the edge histogram generation unit 304 in association with each other.

Reference numeral 306 denotes an inter-image distance calculation unit which calculates similarities (inter-image distances) between the edge histogram of an image input as a query and those of images held by the image DB 304. Reference numeral 307 denotes a display unit which displays an image retrieval result to the user.

<Registration Processing>

Figure 4:
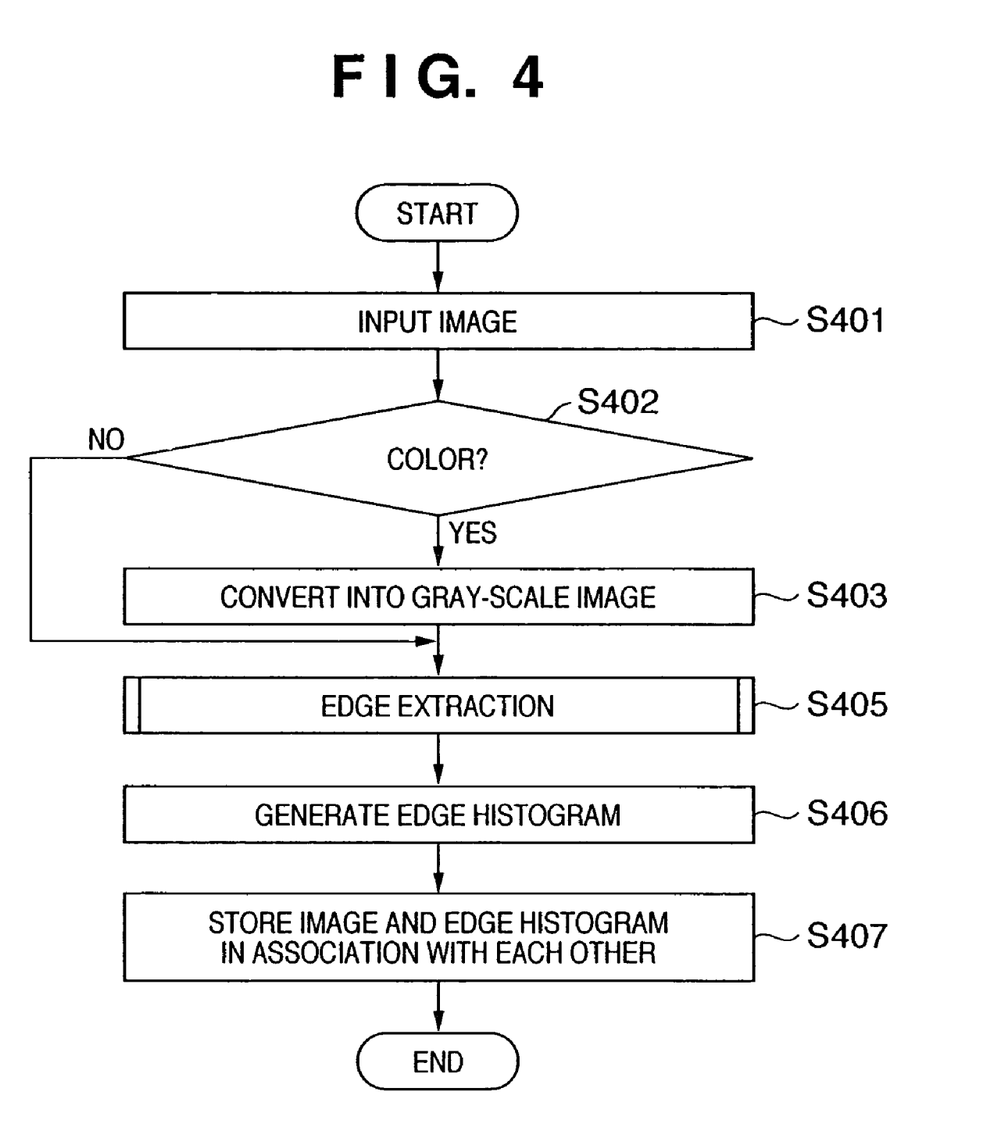
FIG. 4 is a flowchart of processing for registering an image in the computer.

Processing for registering an image in this computer will be described below using FIG. 4 which is the flowchart of this processing. Note that a program for making the CPU 201 execute processing according to the flowchart of FIG. 4 is saved in the external storage device 206, is loaded onto the RAM 203 under the control of the CPU 201, and is executed by the CPU 201. In this way, this computer executes respective processes to be described later.

Upon detection of an image transferred from the scanner 210 or digital camera 211 via the I/F 209 or an image downloaded via the NIC 208, the CPU 201 sequentially inputs data of the image input to this computer to the RAM 203 (step S401).

The CPU 201 then checks if the image input to the RAM 203 (input image) is a color or gray-scale image (step S402). If the input image is a color image, the flow advances to step S403, and the CPU 201 converts this color image into a gray-scale image (step S403). When, for example, the input image is acquired from the digital camera 211, the checking process in step S402 (that for checking if the input image is a color or gray-scale image) can be attained by analyzing the data format of the image and referring to its header information. On the other hand, when the image is acquired from the scanner 210, the checking process can be attained based on the scan conditions set by the user. In any case, the method of checking whether or not the input image is a color image is not limited to any specific method.

Conversion into a gray-scale image in step S403 can be attained by converting R (red), G (green), and B (blue) values of each pixel in the color image data into a gray-scale signal (Y) by:

$$Y=0.299\times R+0.587\times G+0.114\times B \quad (2)$$

If the input image is a gray-scale image, the flow advances from step S401 to step S405 via step S402.

Next, the CPU 201 executes edge extraction processing from the input image (gray-scale image) (step S405). Details of the processing in this step will be described later.

The CPU 201 generates an edge histogram described in the prior art by compiling edges extracted in step S405 (step S406). The CPU 201 saves the input image (color/gray-scale image) in association with the histogram as an index calculated in step S406 in the external storage device 206 (step S407).

In this way, one image is registered in the external storage device 206. Such processing is done for each image input to this computer. Note that the image and index to be saved in the external storage device 206 may be compressed as needed. In this case, after the image and index are read out in the following description, decompression processing must be executed.

Figure 8:
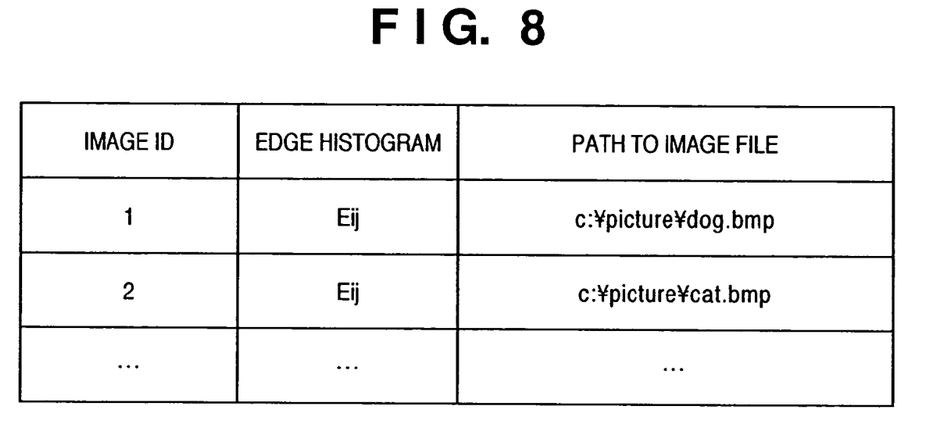
FIG. 8 shows an example of the format of indices for respective images.

FIG. 8 shows an example of the format of indices for respective images. As shown in FIG. 8, an index includes an ID (identifier) unique to each image, the edge histogram of the image, and the saving location (path) of the image in the external storage device 206.

<Edge Extraction Processing>

Figure 7A:
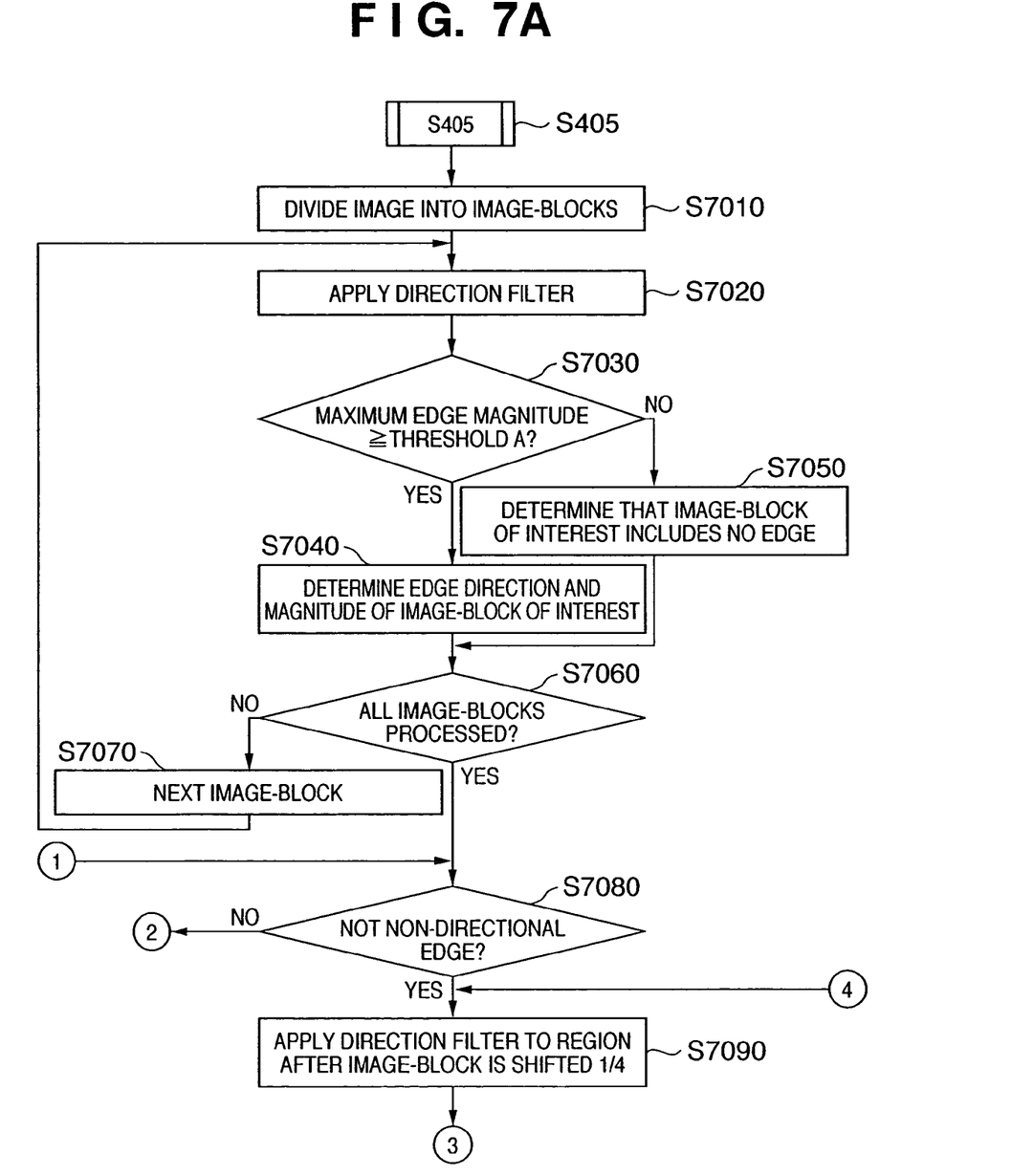
FIGS. 7A and 7B are flowcharts showing details of processing in step S405.
Figure 7B:
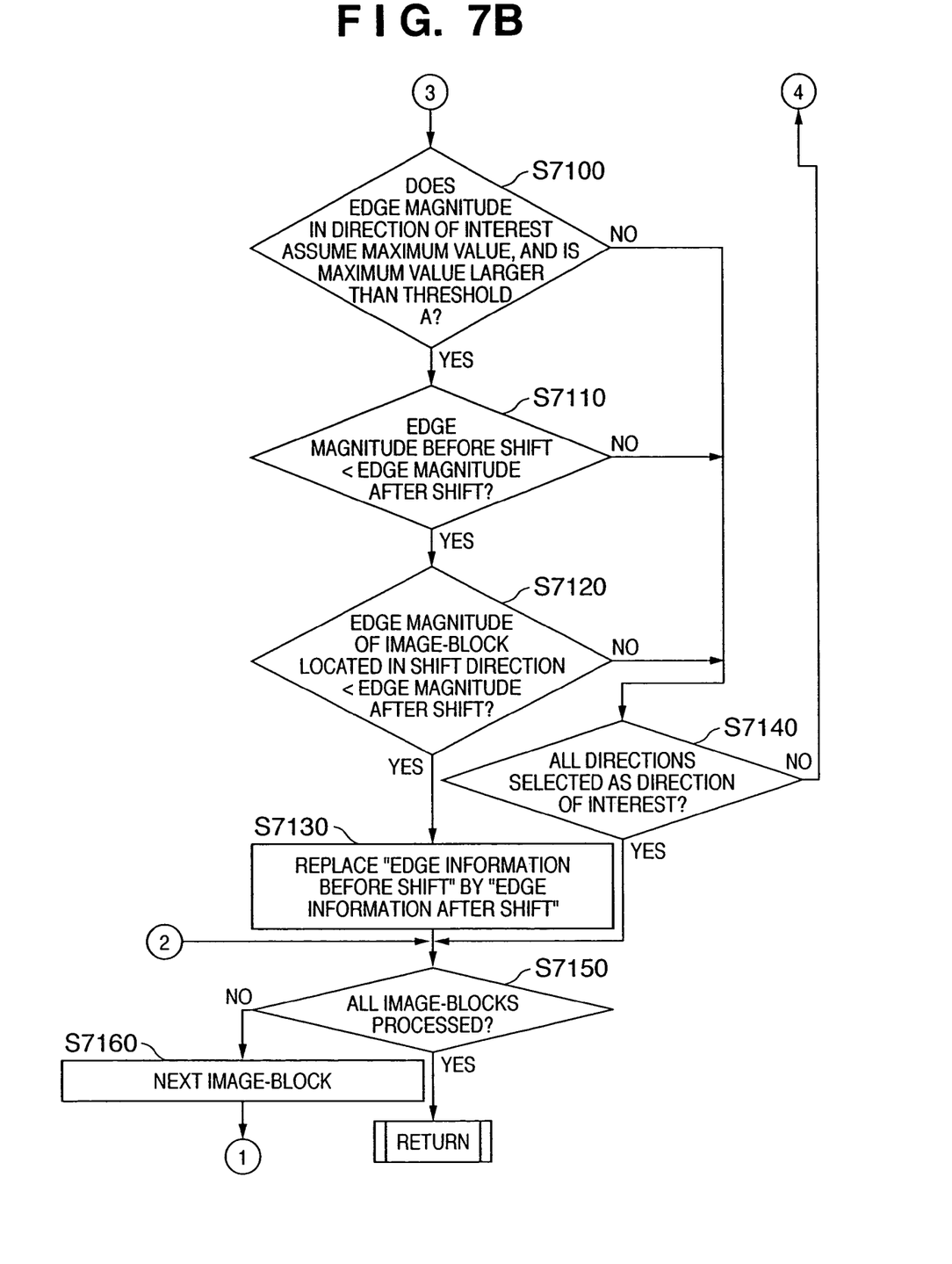

Details of the processing (including the edge extraction processing) to be executed in step S405 will be described below with reference to the flowcharts shown in FIGS. 7A and 7B. FIGS. 7A and 7B are flowcharts showing details of the processing in step S405.

An image (gray-scale image) is divided into a plurality of rectangles (corresponding to image-blocks described above) (step S7010). As described above in the prior art, the image is divided into 4×4 sub-images to assure squares close to a predetermined value. The predetermined value is not particularly limited. Since a 2×2 filter is applied to each image-block, one side of each square must include an even number of pixels equal to or larger than 2. Of course, if 2×2 pixels can be assured, no average brightness need be calculated.

Processes in steps S7020 to S7050 to be described later is applied to each of the divided image-blocks.

The filters 111 to 115 corresponding to the four directions 101 to 104 and non-direction 105 shown in FIG. 1B are applied to an image-block of interest to calculate edge magnitudes (m_v, m_h, m_d45, m_d135, and m_nd) (step S7020).

That is, the filter 111 shown in FIG. 1B is applied to the image-block of interest to calculate an edge magnitude m_v, the filter 112 shown in FIG. 1B is applied to the image-block of interest to calculate an edge magnitude m_h, the filter 113 shown in FIG. 1B is applied to the image-block of interest to calculate an edge magnitude m_d45, the filter 114 shown in FIG. 1B is applied to the image-block of interest to calculate an edge magnitude m_d135, and the filter 115 shown in FIG. 1B is applied to the image-block of interest to calculate an edge magnitude m_nd. In this way, the edge magnitudes (m_v, m_h, m_d45, m_d135, and m_nd) are calculated for the image-block of interest.

It is checked if a maximum value of the edge magnitudes (m_v, m_h, m_d45, m_d135, and m_nd) calculated in step S7020 is equal to or larger than a predetermined threshold A (step S7030). If the maximum value is equal to or larger than the predetermined threshold A, the flow advances to step S7040, and the edge magnitude that exhibits the maximum value of the edge magnitudes (m_v, m_h, m_d45, m_d135, and m_nd), and the direction of that edge are temporarily stored in the RAM 203 as edge information of the image-block of interest (step S7040). The flow then advances to step S7060.

For example, when the edge magnitude that exhibits the maximum value of the edge magnitudes (m_v, m_h, m_d45, m_d135, and m_nd) is m_h, it is determined that "the edge magnitude of the image-block of interest is m_h" and "the direction of the edges included in the image-block of interest is horizontal", and the processing for temporarily recording such determination result as edge information in the RAM 203 in association with the image-block of interest is executed.

It is checked if all the image-blocks have undergone the processes in steps S7020 to S7050 (step S7060). If image-blocks to be processed still remain, the flow advances to step S7070, and the next non-processed image-block is selected as the image-block of interest (step S7070), thus repeating the processes in step S7020 and subsequent steps.

As a result of the checking processing in step S7030, if the maximum value of the edge magnitudes (m_v, m_h, m_d45, m_d135, and m_nd) is less than the predetermined threshold A, the flow advances to step S7050 to determine that the image-block of interest does not include any edge. Hence, information indicating this is temporarily recorded on the RAM 203 (step S7050), and the flow advances to step S7060.

With the above processing, it can be determined if each image-block includes an edge. As for image-blocks including edges, their edge magnitudes and directions can be obtained, and can be recorded on the RAM 203. On the other hand, as for image-blocks which do not include any edge, a message that advises accordingly can be recorded on the RAM 203.

If all the image-blocks have undergone the processes in steps S7020 to S7050, the flow advances from step S7060 to step S7080 to execute the subsequent processes by referring to image-blocks in the raster scan order from the upper left image-block on the image.

Whether or not the edge included in the image-block of interest (which corresponds to an image-block located at the upper left corner of the image when the processing in this step is executed for the first time) is a non-directional edge is determined with reference to the data recorded on the RAM 203 in step S7040 or S7050 in association with this image-block of interest (step S7080).

If the edge included in the image-block of interest is not a non-directional edge, the flow advances to step S7090, the image-block of interest is moved (shifted) by a predetermined amount (¼ the size of the image-block of interest in this embodiment) in a predetermined direction, and the four filters 111 to 114 shown in FIG. 1B are applied to a region in the image-block of interest after movement to calculate edge magnitudes in respective directions (step S7090). Note that this "predetermined direction" makes the right angles with a "direction of interest" to be described below.

FIGS. 6A to 6D are views each for explaining the "predetermined direction" when the direction of interest is "vertical direction", "horizontal direction", "45° angular direction clockwise from a 12 o'clock position", or "135° angular direction clockwise from a 12 o'clock position".

Figure 6A:
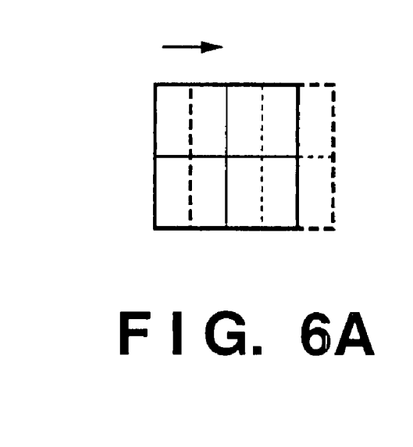
FIGS. 6A to 6D are views each for explaining "predetermined direction" when the direction of interest is "vertical direction", "horizontal direction", "45° angular direction clockwise from a 12 o'clock position", or "135° angular direction clockwise from a 12 o'clock position"
Figure 6B:
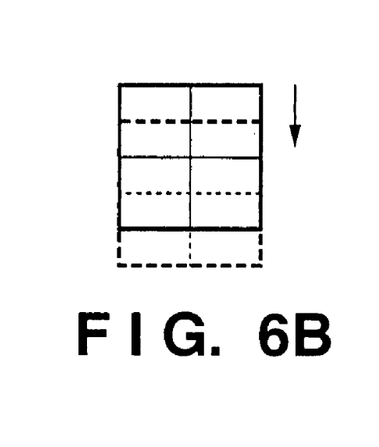
Figure 6C:
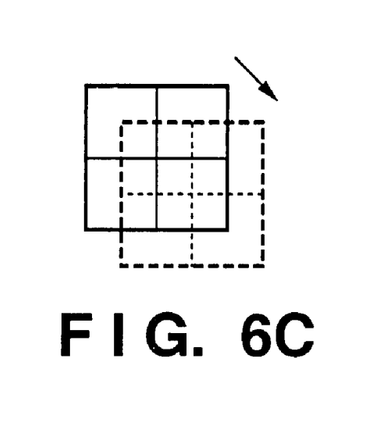
Figure 6D:
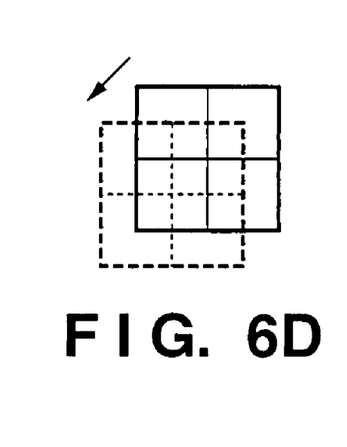

When the direction of interest is the vertical direction, as indicated by 101 in FIG. 1B, the "predetermined direction" corresponds to a horizontal direction, as indicated by the arrow in FIG. 6A. When the direction of interest is the horizontal direction, as indicated by 102 in FIG. 1B, the "predetermined direction" corresponds to a vertical direction, as indicated by the arrow in FIG. 6B. When the direction of interest is the 45° angular direction clockwise from a 12 o'clock position, as indicated by 103 in FIG. 1B, the "predetermined direction" corresponds to a 135° angular direction clockwise from a 12 o'clock position, as indicated by the arrow in FIG. 6C. When the direction of interest is the 135° angular direction clockwise from a 12 o'clock position, as indicated by 104 in FIG. 1B, the "predetermined direction" corresponds to a 225° angular direction clockwise from a 12 o'clock position, as indicated by the arrow in FIG. 6D.

Note that the shift direction in step S7090 is not particularly limited, but it must be fixed in either direction throughout the processing. This is for the following reasons. For example, when a given image-block is shifted in the right horizontal direction, and its left neighboring image-block is shifted in the left horizontal direction, a non-covered region is formed, and an edge extraction failure occurs in that region. Conversely, when a given image-block is shifted in the left horizontal direction, and its left neighboring image-block is shifted in the right horizontal direction, the shifted regions overlap each other, and an edge is extracted doubly.

It is checked if the edge magnitude of the direction of interest of those in the four directions calculated for the image-block of interest after movement in step S7090 assumes a maximum value, and this maximum value is equal to or larger than the predetermined threshold A (step S7100). For example, if the direction of interest is the vertical direction, it is checked if the edge magnitude m_v in the shifted region assumes a maximum value and this maximum value is equal to or larger than the predetermined threshold A. This is because when, for example, the direction of interest is the vertical direction, an edge in the vertical direction like the line segment in FIG. 9A is allowed to be extracted by shifting the image-clock.

If the edge magnitude of the direction of interest of those in the four directions calculated for the image-block of interest after movement in step S7090 assumes a maximum value, and this maximum value is equal to or larger than the predetermined threshold A, the flow advances to step S7110, and the edge magnitude value calculated for the image-block of interest before movement in step S7040 is compared with the maximum value of the edge magnitudes calculated for the image-block of interest after movement (step S7110). This means that if the edge magnitude before shift is larger, an edge can be sufficiently extracted.

If the maximum value of the edge magnitudes calculated for the image-block of interest after movement is larger, the flow advances to step S7120. In step S7120, the edge information recorded on the RAM 203 in step S7040 or S7050 is referred to in association with an image-block which neighbors the image-block of interest before movement in the moving direction (corresponding to the "predetermined direction") (to be referred to as a "neighboring image-block" hereinafter). If the neighboring image-block includes an edge, the magnitude value of this edge is acquired, and the acquired value is compared with the maximum value of the edge magnitudes calculated for the image-block of interest after movement (step S7120).

Figure 10:
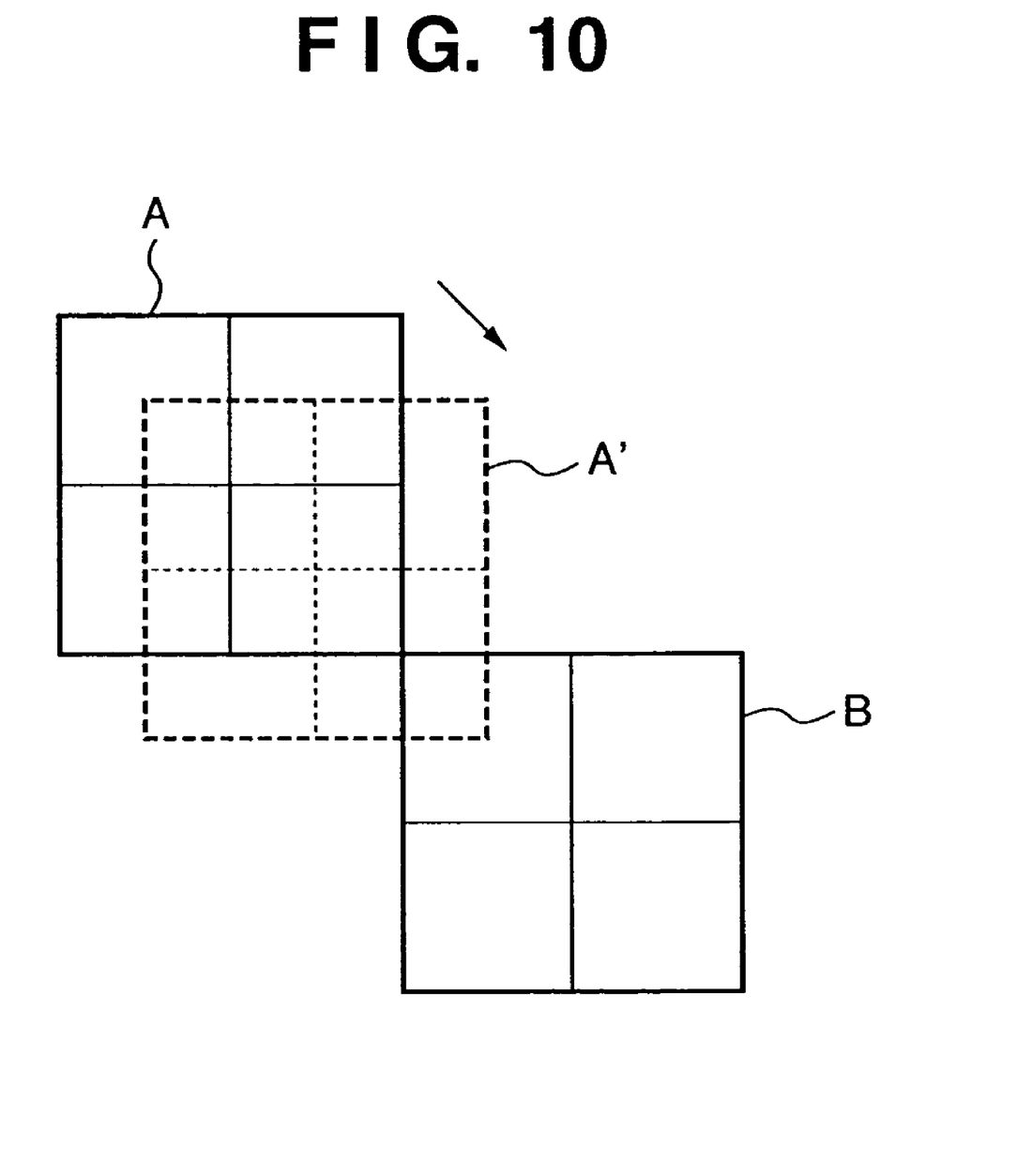
FIG. 10 is a view for explaining a neighboring image-block.

The edge magnitude of the neighboring image-block will be described below using FIG. 10. FIG. 10 is a view for explaining a neighboring image-block. A case will be explained wherein the "predetermined direction" agrees with the 135° angular direction clockwise from the 12 o'clock position, as shown in FIG. 10. However, the gist of the following description remains the same irrespective of angles.

Let A be an image-block of interest before movement, A' be an image-block of interest after movement, and B be a neighboring image-block, as shown in FIG. 10. Then, the edge magnitude calculated for B is that of the neighboring image-block. The reason why the edge magnitude of B (neighboring image-block) is taken into consideration is to avoid repetitive extraction of an edge. If the edge magnitude of A' (shifted region) is smaller, this means that an edge has already been extracted by B (image-block) in the shifted direction. Note that the arrow in FIG. 10 indicates the moving direction of the image-block of interest.

As a result of processing in step S7120, if the edge magnitude value calculated for the neighboring image-block is smaller than the maximum value of the edge magnitudes calculated for the image-block of interest after movement, the flow advances to step S7130 to update the edge magnitude and direction which are recorded on the RAM 203 in step S7040 for the image-block of interest before movement by the maximum value of the edge magnitudes calculated in step S7090 for the image-block of interest after movement, and the edge direction indicated by this maximum value (step S7130). That is the edge magnitude and direction before shift are replaced by those after shift.

If it is determined as a result of the checking processing in step S7100 that the conditions that the edge magnitude of the direction of interest of those in the four directions calculated for the image-block of interest after movement in step S7090 assumes a maximum value, and this maximum value is equal to or larger than the predetermined threshold A are not satisfied, if it is determined as a result of the checking processing in step S7110 that the edge magnitude value calculated in step S7040 for the image-block of interest before movement is equal to or larger than the maximum value of the edge magnitudes calculated for the image-block of interest after movement, or if it is determined as a result of the checking processing in step S7120 that the edge magnitude value calculated for the neighboring block is equal to or larger than the maximum value of the edge magnitudes calculated for the image-block of interest after movement, the flow advances to step S7140 to check if all directions are selected as the direction of interest (if all the directions are applied to the direction of interest) (step S7140). For example, if the direction of interest includes four directions (vertical direction, horizontal direction, 45° direction, and 135° direction), the processes in step S7090 and subsequent steps are executed to have the vertical direction as the direction of interest first, to have the horizontal direction as the direction of interest next, to have the 45° direction as the direction of interest next, and have the 135° direction as the direction of interest finally. After all the directions are selected as the direction of interest, the flow advances to step S7150.

It is checked if all the image-blocks have undergone the processes in steps S7080 to S7140 (step S7150). If image-blocks to be processed still remain, the flow advances to step S7160, and the next non-processed image-block is selected as the image-block of interest (step S7160), thus repeating the processes in step S7080 and subsequent steps.

[Retrieval Processing]

Figure 5:
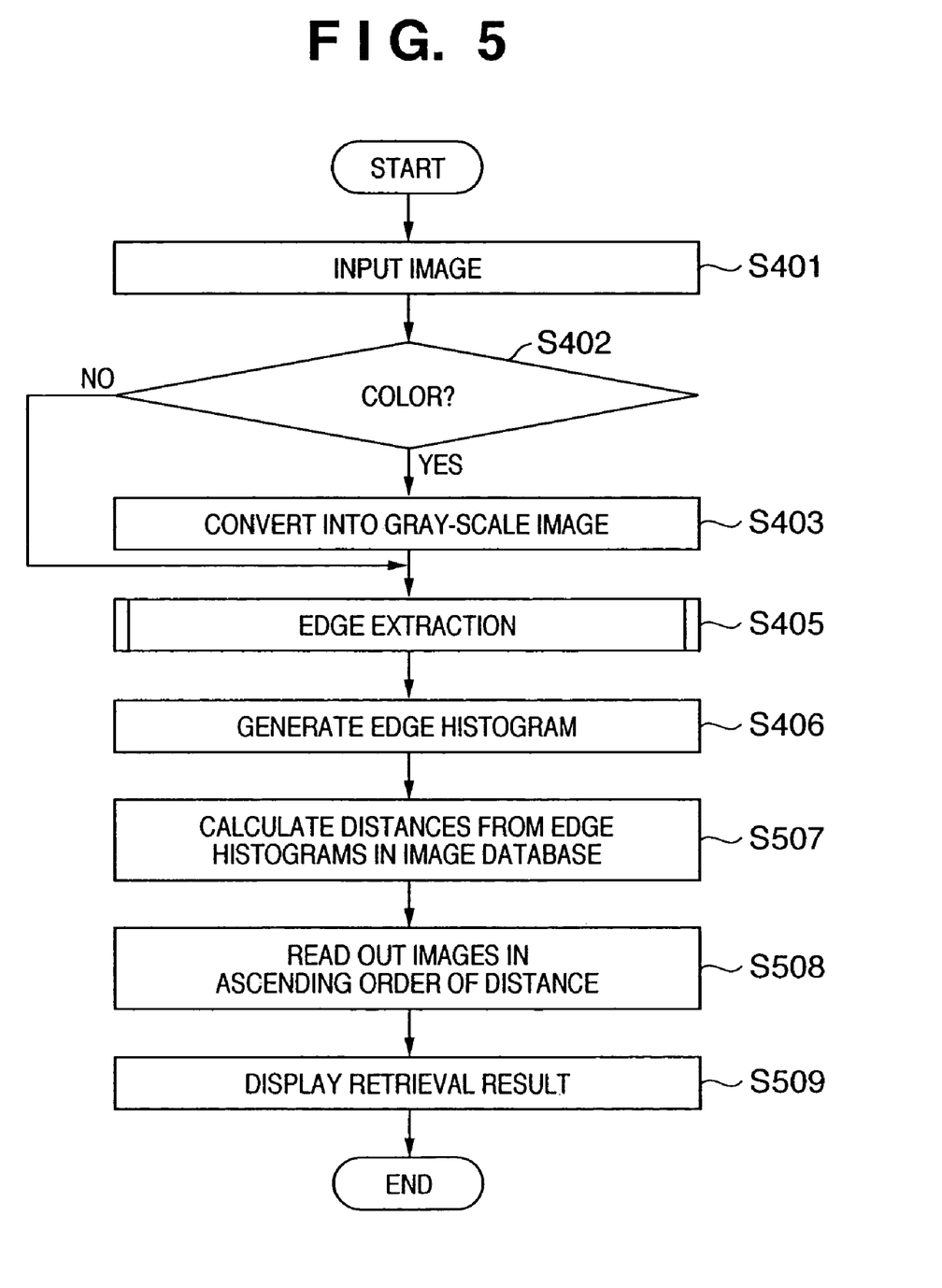
FIG. 5 is a flowchart of image retrieval processing.

Processing for retrieving images which are similar to an image input as a query (query image) of those which are registered in the external storage device 206, as described above, and displaying them on the display screen of the display device 207 will be described below with reference to FIG. 5 which shows the flowchart of that processing. FIG. 5 is a flowchart of the image retrieval processing.

The processes in steps S401 to S406 are applied to a query image to convert the query image into a gray-scale image and to generate the converted image and an edge histogram for the converted image. Since details of the processes in steps S401 to S406 have been described above, a description thereof will be omitted. That is, in the above description of steps S401 to S406, the object to be processed can be read as a query image.

The CPU 201 reads out the edge histogram of each image registered in the external storage device 206 and calculates the distance between the readout edge histogram and that calculated for the query image (step S507). More specifically, the sum total of the absolute values of differences between respective bins of edge histograms can be calculated. Images have higher similarities with decreasing distance, and an image having a smallest distance is selected as the first candidate. A set of the calculated distance and ID of an image to be retrieved are temporarily recorded on the RAM 203.

After the processing for calculating the distance between the edge histogram of each image registered in the external storage device 206 and that calculated for the query image, and temporarily recording a set of the ID of the registered image and calculated distance on the RAM 203 is repeated for all images registered in the external storage device 206, the respective sets are referred to in ascending order of distance (step S508), and images specified by the IDs in the referred sets are read out from the external storage device 206 and are displayed on the display screen of the display device 207 in, e.g., a thumbnail format (step S509). As for display, the images are laid out and displayed in turn from the first candidate from the left to right in each row and from the upper to lower rows.

In this manner, images registered in the external storage device 206 are displayed on the display screen of the display device 207 in a similar order to the query image from the left to right in each row and from the upper to lower rows. Note that not all images need be displayed, but images which have a given distance or less may be displayed. The display condition and method, and the like are not particularly limited.

Second Embodiment

In the first embodiment, the edge histogram described in reference 1 is used as a feature amount to be used in image retrieval. Of course, the present invention is not limited to this. For example, the non-direction filter may not be used, and only direction filters may be used. At this time, the checking processing in step S7080 can be omitted. Since equation (1) calculates the absolute value, no edge direction difference is taken into consideration. Alternatively, an absolute value calculation may be removed from equation (1) to separately handle plus and minus values in consideration of direction differences.

Also, five or more direction filters may be used. In this case, the number of edge directions that can be extracted increases. For example, eight edge directions, i.e., the four directions extracted in the first embodiment and 22.5°, 67.5°, 112.5°, and 157.5° may be extracted.

Whether or not a line segment is formed may be checked in consideration of continuity of extracted edges, and a line histogram that has information associated with a line segment as a feature amount may be calculated. There are two generation methods of the line histogram. A line histogram of the first method is expressed by dividing an image into blocks and defining bins using the numbers of line segments for respective direction components present in these blocks. A line histogram of the second method is expressed by dividing an image into blocks and defining bins using the lengths of line segments for respective direction components present in these blocks.

In the first embodiment, the moving amount of the image-block of interest is set to be ¼ the size of the image-block. However, the present invention is not particularly limited to such specific value. However, the moving amount must not be ½. If the moving amount is ½, the moved image-block just overlaps the 4-divided regions of the image-block. For example, in case of FIG. 9A, when the image-block of interest is shifted ½ in the horizontal direction to extract an edge in the vertical direction, the line segment runs through the center of the shifted image-block. At this time, the edge in the vertical direction cannot be extracted from the line although the image-block of interest is shifted.

In the first embodiment, the image-block is divided into 2×2 regions, and the 2×2 filters are used. However, if a long processing time is all right, the image-block may be divided into 3×3 regions, and a 3×3 filter may be used.

Other Embodiments

Note that the present invention includes a case wherein the invention is achieved by directly or remotely supplying a program of software that implements the functions of the aforementioned embodiments (a program corresponding to the flow charts shown in the respective drawings in the embodiments) to a system or apparatus, and reading out and executing the supplied program code by a computer of that system or apparatus.

Therefore, the program code itself installed in a computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a Floppy® disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-312855 filed on Oct. 27, 2004, the entire contents of which are hereby incorporated by reference herein.

What is claimed is:

1. An image processing method comprising:
using a processor to perform the following:
dividing an image into a plurality of rectangles;
detecting an edge magnitude and an edge direction of a first rectangle, wherein the first rectangle is one of the plurality of rectangles;
calculating an edge magnitude in a direction perpendicular to a predetermined direction from a second rectangle, wherein the second rectangle is located at a position separated from a position of the first rectangle in the predetermined direction by a distance less than a length of one side of the first rectangle; and
deciding an edge magnitude and an edge direction of the first rectangle on the basis of the edge magnitude detected in the detection step and the edge magnitude calculated in the calculation step,
wherein the deciding step includes a second deciding step of deciding, when the edge magnitude calculated in the calculation step is larger than both the edge magnitude of the first rectangle detected in the detection step and the edge magnitude of a rectangle adjacent to the first rectangle in a predetermined direction detected in the detection step, the edge magnitude and edge direction of the first rectangle by updating the edge magnitude and edge direction of the first rectangle to the edge magnitude and edge direction of the second rectangle.

2. The method according to claim 1, wherein the distance is less than ½ of the length of one side of the first rectangle.

3. An image processing method comprising:
using a processor to perform the following:
dividing an image into a plurality of rectangles;
detecting an edge magnitude and an edge direction of a first rectangle, wherein the first rectangle is one of the plurality of rectangles;
calculating an edge magnitude in a direction perpendicular to a predetermined direction from a second rectangle, wherein the second rectangle is located at a position separated from a position of the first rectangle in the predetermined direction by a distance less than a length of one side of the first rectangle; and
deciding an edge magnitude and an edge direction of the first rectangle on the basis of the edge magnitude detected in the detection step and the edge magnitude calculated in the calculation step, wherein, in the dividing step, each of the plurality of rectangles is further divided into a predetermined number of rectangles, and wherein the processor is further used to perform the step of:

generating a histogram by compiling the numbers of edge directions of respective rectangles decided in the deciding step for directions in the respective regions.

4. An image processing method comprising:

using a processor to perform the steps of:

dividing an image into a plurality of regions;

calculating first edge information from a first region, wherein the first region is one of the plurality of regions;

calculating second edge information from a second region, wherein the second region is located at a position separated from a position of the first region in a predetermined direction by a distance less than a length of one side of the first region; and deciding either the first or the second edge information as edge information of an edge in the first region, wherein, in the dividing step, each of the plurality of regions is further divided into a predetermined number of rectangles, and wherein the processor is further used to perform the steps of:

checking if edges of respective rectangles decided in the deciding step form a line segment in the respective regions; and generating, when it is determined in the checking step that the edges form a line segment, a histogram by counting the numbers of line segments for respective directions in the respective regions.

5. A computer-readable storage medium storing a program making a computer execute an image processing method of claim 4.

6. An image processing method comprising:

using a processor to perform the steps of:

dividing an image into a plurality of regions;

calculating first edge information from a first region, wherein the first region is one of the plurality of regions;

calculating second edge information from a second region, wherein the second region is located at a position separated from a position of the first region in a predetermined direction by a distance less than a length of one side of the first region; and deciding either the first or the second edge information as edge information of an edge in the first region, wherein, in the dividing step, each of the plurality of regions is further divided into a predetermined number of rectangles, and wherein the processor is further used to perform:

checking if edges of respective rectangles decided in the deciding step form a line segment in the respective regions; and generating, when it is determined in the checking step that the edges form a line segment, a histogram by counting lengths of line segments for respective directions in the respective regions.

7. An image processing apparatus comprising:

division means for dividing an image into a plurality of rectangles;

detection means for detecting an edge magnitude and an edge direction of a first rectangle, wherein the first rectangle is one of the plurality of rectangles;

calculation means for calculating an edge magnitude in a direction perpendicular to a predetermined direction from a second rectangle, wherein the second rectangle is located at a position separated from a position of the first rectangle in the predetermined direction by a distance less than a length of one side of the first rectangle; and decision means for deciding an edge magnitude and an edge direction of the first rectangle on the basis of the edge magnitude detected by said detection means and the edge magnitude calculated by said calculation means wherein the decision means includes a second decision means of deciding, when the edge magnitude calculated by the calculation means is larger than both the edge magnitude of the first rectangle detected by the detection means and the edge magnitude of a rectangle adjacent to the first rectangle in a predetermined direction detected by the detection means, the edge magnitude and edge direction of the first rectangle by updating the edge magnitude and edge direction of the first rectangle to the edge magnitude and edge direction of the second rectangle.

* * * * *